United States Patent
Poissant et al.

(10) Patent No.: US 12,228,085 B2
(45) Date of Patent: Feb. 18, 2025

(54) SYSTEM AND METHOD FOR THRUST LINEARIZATION WITH THRUST LEVER ANGLE

(71) Applicant: Pratt & Whitney Canada Corp., Longueuil (CA)

(72) Inventors: Jeffrey Poissant, Brossard (CA); Robert Pontarelli, Brossard (CA); Cristina Crainic, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 161 days.

(21) Appl. No.: 17/976,509

(22) Filed: Oct. 28, 2022

(65) Prior Publication Data
US 2024/0141839 A1    May 2, 2024

(51) Int. Cl.
*F02C 9/16* (2006.01)
*F02C 9/28* (2006.01)
*F02C 9/44* (2006.01)

(52) U.S. Cl.
CPC .................. *F02C 9/28* (2013.01); *F02C 9/16* (2013.01); *F02C 9/44* (2013.01); *F05D 2220/323* (2013.01); *F05D 2270/051* (2013.01); *F05D 2270/304* (2013.01); *F05D 2270/311* (2013.01); *F05D 2270/313* (2013.01); *F05D 2270/708* (2013.01)

(58) Field of Classification Search
None
See application file for complete search history.

(56) References Cited

U.S. PATENT DOCUMENTS

| | | | |
|---|---|---|---|
| 3,932,058 A * | 1/1976 | Harner | F02K 1/66 60/236 |
| 4,437,303 A | 3/1984 | Cantwell | |
| 5,622,045 A * | 4/1997 | Weimer | F02C 9/16 60/204 |
| 6,459,963 B1 | 10/2002 | Bennett | |
| 8,849,542 B2 | 9/2014 | Meisner | |
| 11,420,773 B2 | 8/2022 | Huynh | |
| 2006/0212281 A1* | 9/2006 | Mathews | G06F 30/15 703/7 |
| 2017/0107914 A1* | 4/2017 | Lu | F02K 3/04 |
| 2020/0025149 A1* | 1/2020 | Hrach | F01D 11/14 |

OTHER PUBLICATIONS

EP search report for EP23206774.4 dated Mar. 19, 2024.

* cited by examiner

Primary Examiner — Katheryn A Malatek
(74) Attorney, Agent, or Firm — Getz Balich LLC (57) ABSTRACT

A method and system for correlating engine thrust and engine thrust lever angle (TLA) during operation of a gas turbine engine powered aircraft is provided. The method includes: a) providing current flight conditions including a Mach number of the aircraft, altitude of the aircraft, and a TLA; b) determining a corrected fan speed value based on a sensed fan speed and flight conditions; c) determining a first corrected net thrust value based on the corrected fan speed value and the Mach number; d) determining a compensation factor using the corrected fan speed value, the Mach number, and the corrected net thrust value; e) determining a second corrected net thrust value as a function of the TLA; and f) correlating an engine fan speed to the TLA using the second corrected net thrust value as a function of the TLA and the compensation factor.

18 Claims, 5 Drawing Sheets

| Mach Number | | | | | | | | | | | | | | |
|---|---|---|---|---|---|---|---|---|---|---|---|---|---|---|
| | 0 | MN1 | | MN2 | | MN3 | | MN4 | | MN5 | | MNmax | |
| N1R1A norm. | FNTR1A norm. | N1R1A norm. | FNTR1A norm. | N1R1A norm. | FNTR1A norm. | N1R1A norm. | FNTR1A norm. | N1R1A norm. | FNTR1A norm. | N1R1A norm. | FNTR1A norm. | N1R1A norm. | FNTR1A norm. |
| 0.225 | 0.000 | 0.265 | 0.000 | 0.291 | 0.000 | 0.318 | 0.000 | 0.397 | 0.000 | 0.477 | 0.000 | 0.490 | 0.000 |
| 0.331 | 0.133 | 0.331 | 0.088 | 0.344 | 0.073 | 0.358 | 0.057 | 0.437 | 0.064 | 0.503 | 0.049 | 0.517 | 0.050 |
| 0.397 | 0.217 | 0.397 | 0.175 | 0.397 | 0.145 | 0.397 | 0.113 | 0.477 | 0.128 | 0.530 | 0.098 | 0.543 | 0.100 |
| 0.464 | 0.300 | 0.464 | 0.263 | 0.464 | 0.236 | 0.464 | 0.208 | 0.517 | 0.191 | 0.556 | 0.146 | 0.570 | 0.150 |
| 0.530 | 0.383 | 0.530 | 0.351 | 0.530 | 0.327 | 0.530 | 0.302 | 0.556 | 0.255 | 0.583 | 0.195 | 0.596 | 0.200 |
| 0.596 | 0.467 | 0.596 | 0.439 | 0.596 | 0.418 | 0.596 | 0.396 | 0.596 | 0.319 | 0.609 | 0.244 | 0.623 | 0.250 |
| 0.636 | 0.517 | 0.636 | 0.491 | 0.636 | 0.473 | 0.636 | 0.453 | 0.636 | 0.383 | 0.636 | 0.293 | 0.649 | 0.300 |
| 0.675 | 0.567 | 0.675 | 0.544 | 0.675 | 0.527 | 0.675 | 0.509 | 0.675 | 0.447 | 0.675 | 0.366 | 0.675 | 0.350 |
| 0.715 | 0.617 | 0.715 | 0.596 | 0.715 | 0.582 | 0.715 | 0.566 | 0.715 | 0.511 | 0.715 | 0.439 | 0.715 | 0.425 |
| 0.755 | 0.667 | 0.755 | 0.649 | 0.755 | 0.636 | 0.755 | 0.623 | 0.755 | 0.574 | 0.755 | 0.512 | 0.755 | 0.500 |
| 0.795 | 0.717 | 0.795 | 0.702 | 0.795 | 0.691 | 0.795 | 0.679 | 0.795 | 0.638 | 0.795 | 0.585 | 0.795 | 0.575 |
| 0.808 | 0.733 | 0.808 | 0.719 | 0.808 | 0.709 | 0.808 | 0.698 | 0.808 | 0.660 | 0.808 | 0.610 | 0.808 | 0.600 |
| 0.821 | 0.750 | 0.821 | 0.737 | 0.821 | 0.727 | 0.821 | 0.717 | 0.821 | 0.681 | 0.821 | 0.634 | 0.821 | 0.625 |
| 0.834 | 0.767 | 0.834 | 0.754 | 0.834 | 0.745 | 0.834 | 0.736 | 0.834 | 0.702 | 0.834 | 0.659 | 0.834 | 0.650 |
| 0.848 | 0.783 | 0.848 | 0.772 | 0.848 | 0.764 | 0.848 | 0.755 | 0.848 | 0.723 | 0.848 | 0.683 | 0.848 | 0.675 |
| 0.861 | 0.800 | 0.861 | 0.789 | 0.861 | 0.782 | 0.861 | 0.774 | 0.861 | 0.745 | 0.861 | 0.707 | 0.861 | 0.700 |
| 0.874 | 0.817 | 0.874 | 0.807 | 0.874 | 0.800 | 0.874 | 0.792 | 0.874 | 0.766 | 0.874 | 0.732 | 0.874 | 0.725 |
| 0.887 | 0.833 | 0.887 | 0.825 | 0.887 | 0.818 | 0.887 | 0.811 | 0.887 | 0.787 | 0.887 | 0.756 | 0.887 | 0.750 |
| 0.901 | 0.850 | 0.901 | 0.842 | 0.901 | 0.836 | 0.901 | 0.830 | 0.901 | 0.809 | 0.901 | 0.780 | 0.901 | 0.775 |
| 0.914 | 0.867 | 0.914 | 0.860 | 0.914 | 0.855 | 0.914 | 0.849 | 0.914 | 0.830 | 0.914 | 0.805 | 0.914 | 0.800 |
| 0.927 | 0.883 | 0.927 | 0.877 | 0.927 | 0.873 | 0.927 | 0.868 | 0.927 | 0.851 | 0.927 | 0.829 | 0.927 | 0.825 |
| 0.940 | 0.900 | 0.940 | 0.895 | 0.940 | 0.891 | 0.940 | 0.887 | 0.940 | 0.872 | 0.940 | 0.854 | 0.940 | 0.850 |
| 0.954 | 0.917 | 0.954 | 0.912 | 0.954 | 0.909 | 0.954 | 0.906 | 0.954 | 0.894 | 0.954 | 0.878 | 0.954 | 0.875 |
| 0.967 | 0.933 | 0.967 | 0.930 | 0.967 | 0.927 | 0.967 | 0.925 | 0.967 | 0.915 | 0.967 | 0.902 | 0.967 | 0.900 |
| 0.980 | 0.950 | 0.980 | 0.947 | 0.980 | 0.945 | 0.980 | 0.943 | 0.980 | 0.936 | 0.980 | 0.927 | 0.980 | 0.925 |
| 0.993 | 0.967 | 0.993 | 0.965 | 0.993 | 0.964 | 0.993 | 0.962 | 0.993 | 0.957 | 0.993 | 0.951 | 0.993 | 0.950 |
| 1.020 | 1.000 | 1.020 | 1.000 | 1.020 | 1.000 | 1.020 | 1.000 | 1.020 | 1.000 | 1.020 | 1.000 | 1.020 | 1.000 |

SYSTEM AND METHOD FOR THRUST LINEARIZATION WITH THRUST LEVER ANGLE

BACKGROUND OF THE INVENTION

1. Technical Field

The present disclosure relates to model based control of a gas turbine engine in general, and to systems and methods for correlating engine thrust with thrust lever angle in particular.

2. Background Information

Engine net thrust (FNT) is a key engine output parameter for aircraft manufacturers (OEM's) and operators. Engine net thrust (FNT) is typically not measured on wing and is typically derived based on a variety of operating parameters. Accurately knowing an FNT value at particular power ratings (e.g., Max Take-Off, Max Continuous, Max Climb, Max Cruise, etc.) is important and can be a performance requirement of an OEM's power/thrust setting management control logic. The aforesaid specified power ratings are often commanded by pilots by rotating an aircraft's thrust lever; i.e., the pivotable lever used by the pilot to adjust the power produced by the aircraft engine. Thrust levers are typically configured to pivot about a point and have a length of rotational travel between a first circumferential position located at one end of the lever rotational travel (e.g., the position associated with the minimum amount of power produced by the engine—idle) and a second circumferential position located at the opposite end of the lever rotational travel (e.g. the position associated with the maximum amount of power produced by the engine—maximum power). The thrust lever may be positioned in a plurality of rotational travel positions in between the minimum and maximum power settings. In some instances, a thrust lever may be configured with one or more detented positions, each associated with an engine power setting (e.g., idle, maximum take-off power, maximum continuous power, maximum climb power, maximum cruise power, etc.) to facilitate aircraft operation.

Typically, it is the function of the power/thrust setting management control logic (PTS management control logic) to correlate the engine thrust and the thrust lever position (often referred to as "thrust lever angle" or "TLA"). From an engine thermodynamic point of view, the relationship between thrust and engine parameters (e.g., fan speed) is non-linear. Hence, it can be a challenge to accurately correlate thrust lever position to engine net thrust (FNT). What is needed is a system and method for producing a desirable relationship between engine thrust and thrust lever position; e.g., one in which actuation of the thrust lever produces power in a smooth and predictable manner.

SUMMARY

According to an aspect of the present disclosure, a method for correlating engine thrust and engine thrust lever angle (TLA) during operation of a gas turbine engine powered aircraft is provided. The method includes: a) providing current flight conditions including a Mach number of the aircraft, altitude of the aircraft, and a TLA; b) determining a corrected fan speed value based on a sensed fan speed and flight conditions; c) determining a first corrected net thrust value based on the corrected fan speed value and the Mach number; d) determining a compensation factor using the corrected fan speed value, the Mach number, and the corrected net thrust value; e) determining a second corrected net thrust value as a function of the TLA; and f) correlating an engine fan speed to the TLA using the second corrected net thrust value as a function of the TLA and the compensation factor.

In any of the aspects or embodiments described above and herein, the step of determining a compensation factor may include using a reverse process that determines a reverse corrected fan speed value using the corrected net thrust value and the Mach number.

In any of the aspects or embodiments described above and herein, the reverse process may use a stored data structure accessible by an onboard controller.

In any of the aspects or embodiments described above and herein, the stored data structure may be a data table, and the data stored in the data table may be produced using a thermodynamic steady-state engine model. The thermodynamic steady-state engine model may be run with one or more fixed flight condition variables.

In any of the aspects or embodiments described above and herein, the fixed flight condition variables may include ambient air temperature and ambient air humidity.

In any of the aspects or embodiments described above and herein, the first corrected net thrust value and the corrected fan speed or second correct fan speed values may be normalized values.

In any of the aspects or embodiments described above and herein, the method may further include determining a reverse corrected fan speed as a function of TLA using a reverse process that determines the reverse corrected fan speed as a function of TLA using the second corrected net thrust value as a function of the TLA and the Mach number.

According to another aspect of the present disclosure, a system for correlating engine thrust and engine thrust lever angle (TLA) during operation of a gas turbine engine powered aircraft is provided. The aircraft has a gas turbine engine aircraft and a thrust lever in communication with the gas turbine engine. The system includes a first sensor, a second sensor, a third sensor, and a controller. The first sensor is operable to determine a Mach number of the aircraft. The second sensor is operable to determine a thrust lever angle (TLA) of the thrust lever and to provide a signal representative of the thrust lever angle. The third sensor is operable to sense a fan speed value and provide a signal representative of the fan speed. In some embodiments, the system may include a fourth sensor operable to measure the total temperature at the engine inlet. The controller is in communication with the first, second, and third sensors (and fourth as applicable), and a memory device storing instructions. The instructions when executed cause the analyzer to: a) determine a corrected fan speed value based on a sensed fan speed using the third sensor signals and one or more flight conditions; b) determine a first corrected net thrust value based on the corrected fan speed value and the Mach number; c) determine a compensation factor using the corrected fan speed value, the Mach number, and the corrected net thrust value; d) determine a second corrected net thrust value as a function of the TLA; and e) correlate an engine fan speed to the TLA using the second corrected net thrust value as a function of the TLA and the compensation factor.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 5 is an embodiment of an exemplary data table that may be used in the present disclosure.

DETAILED DESCRIPTION

Figure 1:
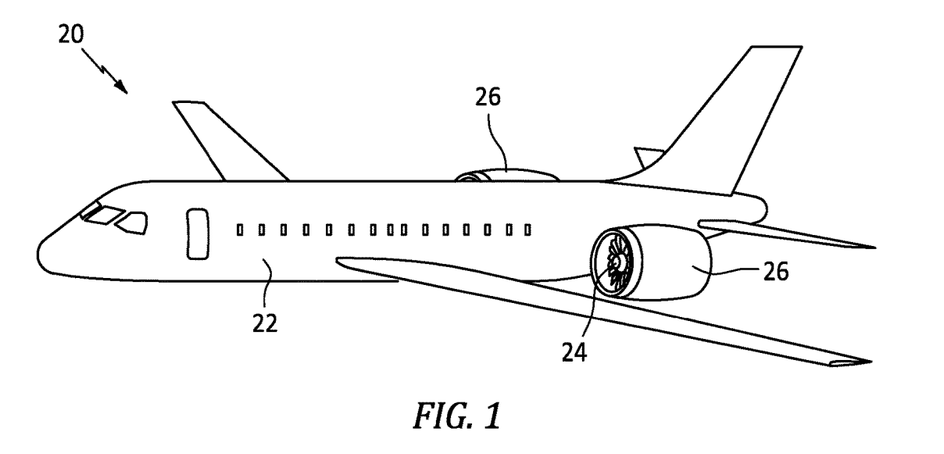
FIG. 1 is a diagrammatic view of an aircraft powered by a gas turbine engine.

An example of an aircraft 20 is shown in FIG. 1 that may utilize the present disclosure system and method. The aircraft includes a fuselage 22 and a pair of gas turbine engines 24, each disposed within a respective nacelle 26.

Figure 2:
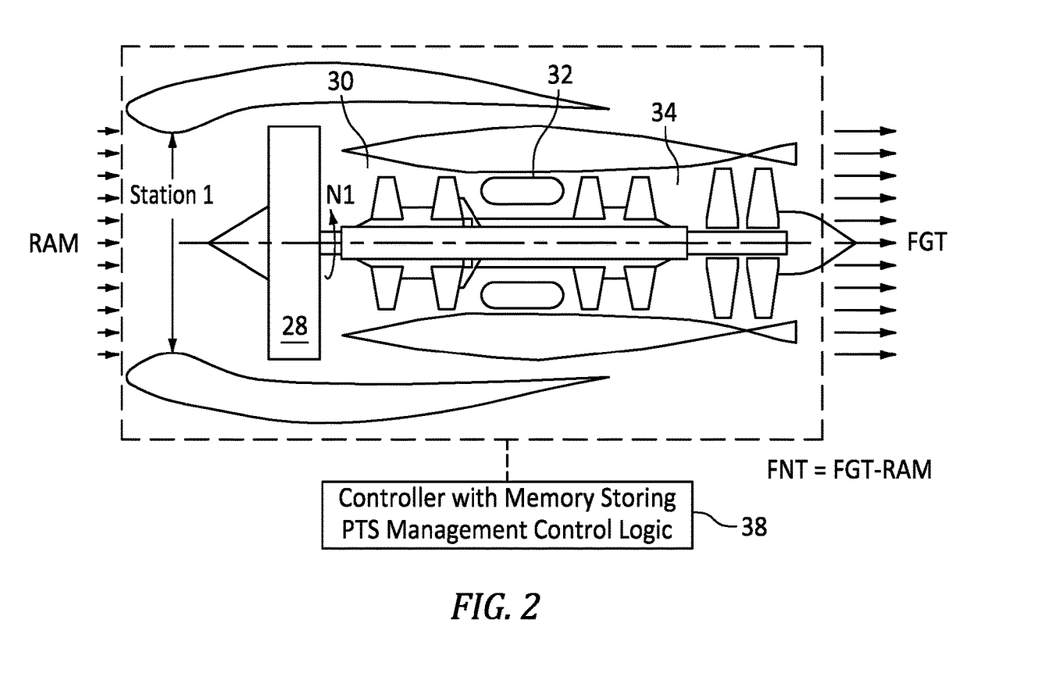
FIG. 2 is a diagrammatic sectional view of a gas turbine engine.

FIG. 2 diagrammatically illustrates an example of a gas turbine engine 24 with which the present disclosure may be used. The engine 24 includes a fan 28 through which ambient air is propelled, a compressor section 30 for pressurizing the air, a combustor 32 in which the compressed air is mixed with fuel and ignited for generating an annular stream of hot combustion gases, and a turbine section 34 for extracting energy from the combustion gases. High pressure rotor(s) of the turbine section 34 are drivingly engaged to high pressure rotor(s) of the compressor section 30 through a high pressure shaft. Low pressure rotor(s) of the turbine section 34 are drivingly engaged to the fan rotor and to other low pressure rotor(s) (not shown) of the compressor section 30 through a low pressure shaft extending within the high pressure shaft and rotating independently therefrom.

Figure 3:
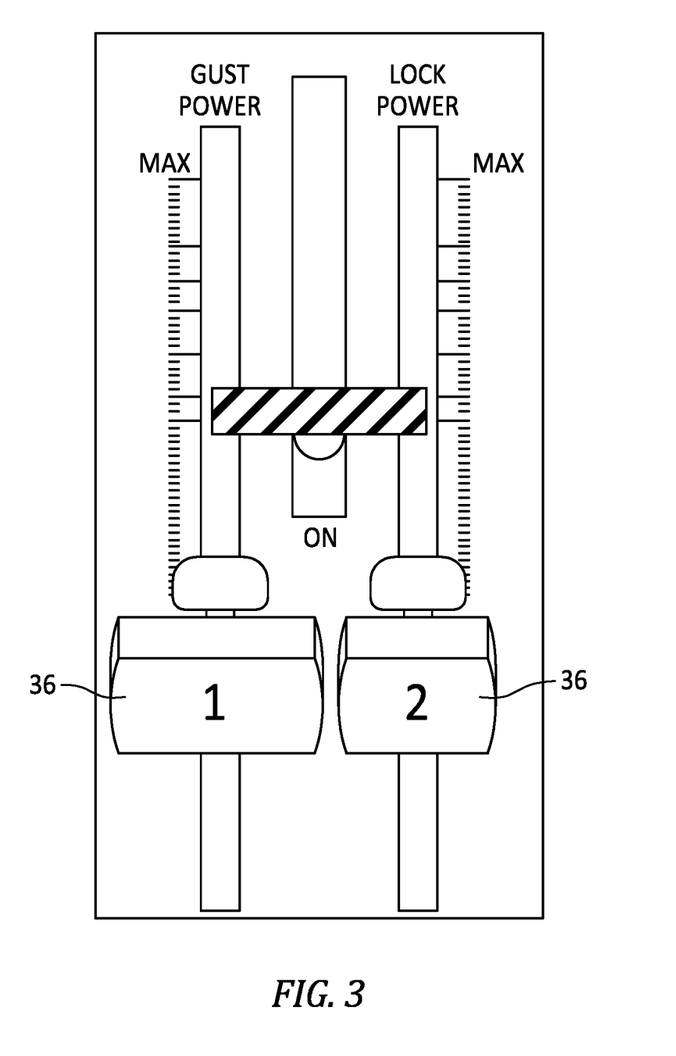
FIG. 3 is a diagrammatic view of aircraft thrust levers.

FIG. 3 diagrammatically illustrates thrust levers 36 that may be disposed in the cockpit of an aircraft 20.

Embodiments of the present disclosure utilize power/thrust setting management control logic (hereinafter referred to as "PTS management control logic") to correlate the engine thrust and the thrust lever 36 position (often referred to as "thrust lever angle" or "TLA"). The PTS management control logic may include a series of stored instructions executable by a controller 38 present within the aircraft 20. The controller 38 may be a single controller configured to process input data signals, execute stored instructions, and produce output control signals to more than one system aboard the aircraft, or the functionality of the controller 38 may be performed by a plurality of controllers acting in concert. The present disclosure is not limited to any particular controller 38 configuration. To simplify the description of the present disclosure herein, the controller 38 operable to execute the stored instructions associated with the PTS management control logic will be referred to as the "controller 38". The controller 38 may be in communication with other components within the system, including but not limited to thrust lever position sensors, ambient condition sensors (e.g., altitude, air temperature, total and/or static air pressure, fan speed, Mach number, humidity, RAM force), aircraft bleed air, and the like.

The controller 38 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The controller 38 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 38 may include, or may be in communication with, an input device that enables a user to enter data and/or instructions, and may include, or be in communication with, an output device configured, for example to display information (e.g., a visual display), or to transfer data, etc. Communications between the controller 38 and other system components may be via a hardwire connection.

As indicated above, it is desirable to correlate engine thrust and the thrust lever angle (TLA), but it is often the case that relationship between engine thrust and engine 24 parameters (e.g., fan speed) is nonlinear. An aircraft engine 24 producing a predetermined amount of thrust at a given throttle lever setting is often a performance requirement. It is often the case, however, that two new same type engines 24 will produce different amounts of thrusts under similar operational conditions. To ensure that aircraft performance requirements are met, very often an aircraft is configured assuming a predetermined worst case thrust scenario (generic to that engine 24 type) and that predetermined worst case thrust scenario is applied regardless of the actual thrust produced by that particular engine 24. As a result, the correlation between engine thrust and the thrust lever angle (TLA) often includes a built-in discrepancy.

The present disclosure provides a system and method for correlating engine thrust and thrust lever angle (TLA) for a predetermined range of thrust lever angle. Importantly, the present disclosure system and method for correlating engine thrust and the thrust lever angle (TLA) is also predicated on actual data from that particular engine 24. Hence, the present disclosure system and method for correlating engine thrust and the thrust lever angle (TLA) provides a means to improve the linearity between engine thrust and thrust lever angle (TLA); one that utilizes engine 24 performance data from the specific engine 24 being used in the process. Hence, the present disclosure is understood to minimize engine thrust/thrust lever travel nonlinearity. As a result, the engine thrust to thrust lever angle is substantially smoother, more uniform, predictable, and intuitive.

As indicated above, engine net thrust (FNT) is not typically measured directly on-wing. The rotational speed of the engine fan 28 ("fan speed" or "N1") may be measured and may be subsequently used to determine an FNT value. The N1 value at the inlet position (labeled as "Station 1" within the nacelle 26 forward of the engine fan 28 in FIG. 2) may be corrected to produce a corrected fan speed value referred to as N1R1A and the FNT value at the inlet position may be corrected to produce a corrected net thrust value referred to as FNTR1A. Corrected fan speed N1R1A is a known parameter that normalizes inlet temperature to a standard reference temperature. Corrected fan speed N1R1A may be determined using an equation like that shown in Equation 1 below.

$$N1R1A = \frac{N1}{\sqrt{T1/T_{Standard\ Ref}}} \quad \text{Eqn. 1}$$

where T1 is the inlet temperature and $T_{Standard\ Ref}$ is a standard reference temperature. Corrected net thrust value FNTR1A is a known parameter that normalizes inlet pressure to a standard reference pressure. Corrected net thrust value FNTR1A may be determined using an equation like that shown in Equation 2 below.

$$FNTR1A = \frac{FNT}{(P1/P_{Standard\ Ref})} \quad \text{Eqn. 2}$$

Where P1 is the air pressure at the inlet and $P_{Standard\ Ref}$ is a standard reference pressure. As will be described herein, the present disclosure may use FNTR1A and/or N1R1A values in normalized or unnormalized form. The terms "forward" and "aft" as used herein refer to gas path orientation, which may equate to engine 24 axial position, but not always. Air or core gas passing through a gas turbine engine 24 will encounter a "forward" first engine 24 component before it encounters an "aft" second engine 24 component. In the gas turbine engine 24 shown in FIG. 2, for example, the fan 28 is shown disposed forward of the compressor, and conversely the compressor is shown aft of the fan 28.

Embodiments of the present disclosure utilize a PTS management control logic (stored instructions) to correlate the engine thrust and the thrust lever 36 angle ("TLA"). FIG. 3 diagrammatically illustrates a thrust lever 36 arrangement having a range of thrust lever angles between a minimum value (e.g., idle) and a maximum value (maximum power). In some instances, there may be some predetermined thrust lever angles between the thrust lever minimum and maximum thrust positions that are identified for certain operational settings (Max continuous, Max climb, Max cruise, etc.).

In some embodiments, the present disclosure provides a correlation between engine thrust and the thrust lever angle (TLA) for the entire range of movement for the thrust lever 36; i.e., between a 0% thrust lever angle (e.g., at idle) and a 100% thrust lever angle (e.g., at max thrust). In other embodiments, the present disclosure may be configured to provide the aforesaid correlation between engine thrust and the thrust lever angle (TLA) for less than the entire range of movement; i.e., a subset of thrust lever 36 travel. For example, some present disclosure embodiments may be configured to provide the correlation between engine thrust and the thrust lever angle (TLA) between a base percentage of thrust lever angle (e.g., 20%) and a second percentage of thrust lever angle (e.g., 100%). This subset represents a customization of the correlation that may be desirable in certain applications and/or by certain aircraft operators. The present disclosure is not limited to providing the aforesaid correlation for any particular range of the thrust lever 36 angles. In the thrust lever travel regions not covered by the correlation, alternative means of relating thrust lever angle to engine 24 operation may be used. For example, in the first 20% of thrust lever travel, the thrust lever travel angle may be related to fan speed (N1) or corrected fan speed (N1R1A).

Figure 4:
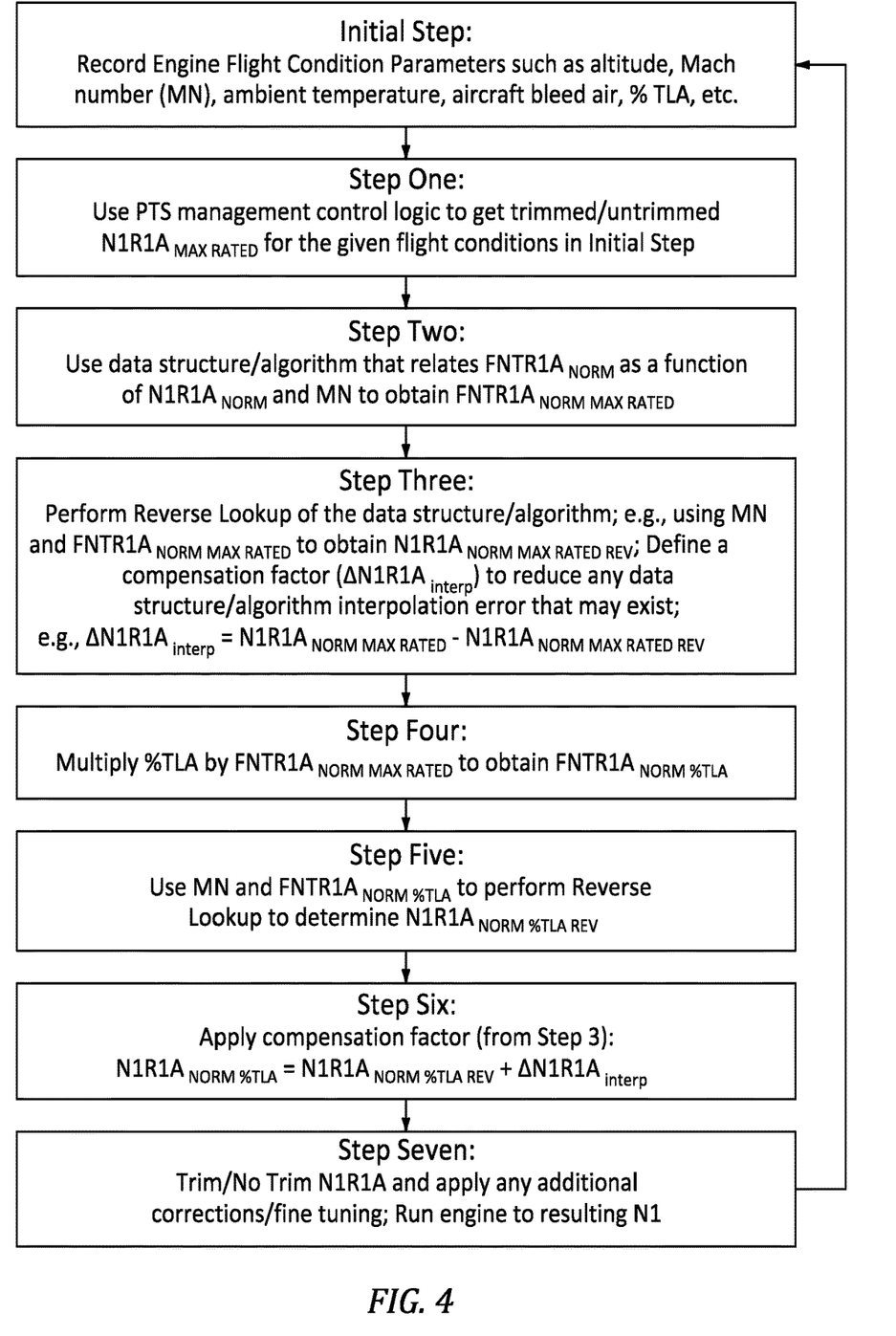
FIG. 4 is a flow chart of an embodiment of the present disclosure.

An example methodology that may be used to correlate engine thrust and the thrust lever angle (TLA) is illustrated in the flow chart shown in FIG. 4. In the Initial Step, certain flight conditions are determined during aircraft operation and are reported to the controller 38 for access by the PTS management control logic. Nonlimiting examples of the flight conditions include the Mach number (MN) of the aircraft, the ambient air temperature, the intake air that is bled off the engine 24 (i.e., "bleed air") for the aircraft/engine application at hand, the then percentage of thrust lever 36 angle, etc. The present disclosure is not limited to using these specific flight conditions, and may not use all the identified flight conditions, or may use alternative flight conditions, or may use additional flight conditions, or any combination thereof.

In Step One, the PTS management control logic (stored instructions) is used to determine a corrected maximum rated fan speed value referred to as $N1R1A_{MAX\ RATED}$ based on the determined flight conditions. The PTS management control logic may include tabulated values of N1R1A for a plurality of different engine power ratings, with each set of tabulated values (e.g., table) compiled as a function of one or more flight conditions (e.g., altitude, aircraft MN, etc.). In some embodiments, additional control logic (e.g., tabulated values) may be included that can be used to adjust N1R1A for requested bleed air quantities. The corrected maximum rated fan speed value ($N1R1A_{MAX\ RATED}$) represents the corrected fan speed value at the maximum power rating of the engine 24. In one embodiment, the PTS management control logic is designed to provide the N1R1A or N1 that will guarantee a minimum level of FNT, as agreed upon between the engine and aircraft manufacturers. In this embodiment, the provided N1 would guarantee the engine FNT even for the fastest acceptable production engine (i.e. the engine whose fan is required to turn faster than other production engines to achieve the same thrust, as a result of, for example, variations imperfections in individual components within manufacturing tolerances). The N1R1A from the PTS management control logic that is applicable to the fastest acceptable production engine may be referred to as "untrimmed N1R1A." The difference in N1R1A speed between the fastest allowable new production engine and the actual engine 24 when newly manufactured, at a predefined operating condition, is referred to herein as the "N1R1A trim". N1R1A trim is typically determined experimentally during engine production; however, other approaches may exist such as through analytical predictions of the specific production engine 24. Subtracting the N1R1A trim from untrimmed N1R1A is referred as "trimmed N1R1A". The corrected maximum rated fan speed value ($N1R1A_{MAX\ RATED}$) may be for an engine 24 in a trimmed $N1R1A_{MAX\ RATED}$ state or an untrimmed state.

It should be noted that the present disclosure may be implemented using corrected fan speeds and corrected net thrust in unnormalized form or in normalized form. Corrected net thrust and corrected fan speeds may be normalized using one of many possible values, for example, corrected fan speed could be normalized by the maximum allowable N1R1A speed during typical, steady-state field operation, typically provided in an engine maintenance manual (also often referred to as the "Red Line" limit). To facilitate the description herein, the present disclosure is described in terms of "normalized corrected fan speed" and "normalized corrected net thrust value. However it is to be understood that the present disclosure is not limited to using normalized values.

In Step Two, a normalized corrected net thrust value ($FNTR1A_{NORM\ MAX\ RATED}$) is determined based on maximum normalized corrected fan speed values ($N1R1A_{NORM\ MAX\ RATED}$) and Mach number (MN) values. In some embodiments, the normalized corrected net thrust value ($FNTR1A_{NORM\ MAX\ RATED}$) may be determined using a stored data structure containing a range of normalized corrected fan speed values ($N1R1A_{NORM}$) and normalized corrected net thrust values ($FNTR1A_{NORM}$), as a function of Mach number (MN) values. The appropriate normalized corrected net thrust values ($FNTR1A_{NORM}$) can be chosen from the table based on an input normalized corrected fan speed value ($N1R1A_{NORM}$) and determined Mach number (MN) value. FIG. 5 provides an example of such a data structure in the form of a data table (labeled as "N1R1A norm" and "FNTR1A norm" in FIG. 5). The aforesaid data table is an example of an acceptable data structure. The present disclosure is not limited to any particular type of data structure.

In some embodiments, the normalized corrected fan speed values ($N1R1A_{NORM}$), Mach number (MN) values, and normalized corrected net thrust value ($FNTR1A_{NORM}$) values within the data structure may be derived by using a thermodynamic steady-state engine model to simulate flights at given altitudes and Mach numbers. The normalized corrected net thrust value ($FNTR1A_{NORM}$) may be set to a zero value for the lowest $N1R1A_{NORM}$ (typically idle speed) and the normalized corrected net thrust value ($FNTR1A_{NORM}$) may be set to a one (1) value for the highest $N1R1A_{NORM}$ (usually a value beyond the OEM flight envelope), with values there between normalized based on these two extrema, for each Mach number (MN). In some instances, more than one data table may be used; e.g., different tables for different altitudes and Mach numbers. For example, a first data table may contain data values derived for an altitude of fifteen thousand feet (15K feet) and Mach numbers (MN) in a range of zero to 0.65 MN, at a fixed total air temperature and humidity. A second data table may contain data values derived for an altitude of forty thousand feet (40K feet) and Mach numbers (MN) of 0.8 MN to 0.925 MN, at a fixed total air temperature and humidity. The flight parameters (e.g., MN, N1R1A, etc.) used in the preparation of these tables may be chosen based on the application at hand. Additional Mach number (MN) and normalized corrected fan speed values ($N1R1A_{NORM}$) values may be used, but may require additional computational power and/or slow computational speed each time the table is evaluated. The flight parameters (MN and N1R1A) may also be chosen based on the specific engine 24 being represented. For example, the normalized corrected fan speeds shown in the table in FIG. 5 go from 0.225 to 1.020. The lowest fan speed value (i.e., 0.225) reflects a fan speed about or just below an idle fan speed for the specific engine 24 being modeled and the highest fan speed value (i.e., 1.020) reflects a fan speed at or above the maximum attainable fan speed for the specific engine 24 being modeled during typical operation. The present disclosure is not limited to using these particular flight parameters (MN and N1R1A) and is also not limited to the specific form of the data; e.g., as stated above, the fan speeds may be indicated as unnormalized or normalized values (based on maximum and minimum values) or even as rpms.

In addition, as indicated above the tables are based on some assumed flight parameters; e.g., air temperature and humidity. The present disclosure is not limited to these flight parameters. The data tables may alternatively or in addition be based on parameters such as altitude, exhaust size for engines 20 having a variable geometry exhaust, and the like, or any combination thereof. Adding additional flight parameters would increase the table size and may increase the accuracy of the data, potentially at the cost of requiring additional computational power and/or having a slower computational speed each time the table is evaluated. In this embodiment, the normalized corrected net thrust value ($FNTR1A_{NORM}$) data values within the tables are derived using a thermodynamic steady-state engine model. Using the data produced by the model in these tables will likely require interpolating values. Adding additional flight parameters may increase the amount of multi-variate interpolation error. The increased error would therefore require a more complex set of compensation factors to correct it. Examples of how compensations may be determined and used are provided hereinafter.

As an alternative to using a thermodynamic steady-state engine model, the data tables described above may be based on experimental engine rig testing (where N1R1A and MN are varied independently) or it could be based on data developed during experimental flight testing of the engine 24 (e.g., where N1R1A and MN are varied independently).

As an alternative to using data tables, normalized corrected net thrust value ($FNTR1A_{NORM}$) may be related to normalized corrected fan speed values ($N1R1A_{NORM}$) and Mach number (MN) values using an algorithm. The term "algorithm" is meant to include mathematical equations, functions, expressions, physics-based correlations, or the like and is not limited to any particular form. Such an algorithm could be derived using least-squares curve fits or various interpolations through analytical simulations or experimental measurements.

As yet another alternative to using data tables, normalized corrected net thrust value ($FNTR1A_{NORM}$) may be related to normalized corrected fan speed values ($N1R1A_{NORM}$) and Mach number (MN) values using a full on-board thermodynamic engine model. It is likely, however, that an algorithm or a thermodynamic engine model would require significant computational power; e.g., the algorithm or the engine model would need to be operated in a manner that produces data several times per second.

As stated above, the process of determining normalized corrected net thrust values ($FNTR1A_{NORM}$) will likely involve some amount of interpolation and therefore may have inherent interpolation error. In Step Three, an interpolation "compensation factor" is determined that accounts for any interpolation error that may be present during the association of the normalized corrected fan speed values ($N1R1A_{NORM}$) and Mach number (MN) values with the normalized corrected net thrust value ($FNTR1A_{NORM}$) values. In some embodiments, an interpolation "compensation factor" may be determined using a "reverse table lookup" to compensate for any interpolation errors. For example, a reverse lookup table may be utilized to obtain normalized corrected fan speed values ($N1R1A_{NORM}$) as a function of normalized corrected net thrust values ($FNTR1A_{NORM}$) and Mach number values. The compensation factor may reflect a difference between the normalized corrected maximum rated fan speed values ($N1R1A_{NORM\ MAX\ RATED}$) utilized in the data structure (with respective Mach numbers—MN) to obtain a normalized corrected net thrust values ($FNTR1A_{NORM\ MAX\ RATED}$) and reverse normalized corrected maximum rated fan speed values ($N1R1A_{NORM\ MAX\ RATED\ REV}$) obtained using the reverse table lookup based on the normalized corrected net thrust values (FNTR1A$_{NORM\ MAX\ RATED}$) and Mach numbers (MN); e.g., see Equation 3 below:

$$\Delta N1R1A_{interp} = N1R1A_{NORM\ MAX\ RATED} - N1R1A_{NORM\ MAX\ RATED\ REV} \quad \text{Eqn 3}$$

For those present disclosure embodiments that use analytical model data (e.g., produced using experimental engine rig testing) or empirical data developed during experimental flight testing of an engine 24, the reverse table may be produced using the respective analytical model data or empirical model data. For those present disclosure embodiments that use an algorithm to produce related normalized corrected net thrust value (FNTR1A$_{NORM}$) values based on normalized corrected fan speed values (N1R1A$_{NORM}$) and Mach number (MN) values, an inverse algorithm may be used to determine normalized corrected fan speed values (N1R1A$_{NORM}$) based on normalized corrected net thrust value (FNTR1A$_{NORM}$) values and Mach number (MN) values, as well as a "compensation factor" that can be used with the algorithm approach. As indicated above, embodiments of the present disclosure that utilize a data structure (e.g., both the initial data table and a reverse data table) are understood to provide an approach that is computationally more efficient than an algorithmic approach.

In Step Four, the thrust lever angle or percentage (% TLA) and the maximum normalized corrected net thrust values (FNTR1A$_{NORM}$ MAX RATED) are used to obtain normalized corrected net thrust values as a function of thrust lever angle (FNTR1A$_{NORM\ \%\ TLA}$), thereby relating the normalized corrected net thrust values (FNTR1A$_{NORM\ MAX\ RATED}$) to thrust lever angle (TLA) percentages. Step Four may be performed by multiplying respective thrust lever angle percentages (% TLA) and normalized maximum corrected net thrust values (FNTR1A$_{NORM\ MAX\ RATED}$) to produce the normalized corrected net thrust values as a function of thrust lever angle (FNTR1A$_{NORM\ \%\ TLA}$) values; e.g., see Equation 4:

$$FNTR1A_{NORM\ \%\ TLA} = \%\ TLA * FNTR1A_{NORM\ MAX\ RATED} \quad \text{Eqn. 4}$$

A data structure (e.g., a data table) may be populated with the normalized corrected net thrust values as a function of thrust lever angle values (FNTR1A$_{NORM\ \%\ TLA}$) as a function of the related normalized corrected fan speed values (N1R1A$_{NORM}$) and Mach number (MN) values in a manner similar to that described above; e.g., using tables like that shown in FIG. 5.

The above described process for determining normalized corrected net thrust values as a function of thrust lever angle (FNTR1A$_{NORM\ \%\ TLA}$) will likely involve some amount of interpolation and therefore may have inherent interpolation error. In some embodiments, a "reverse table lookup" process (or reverse algorithm) may be used to identify any interpolation errors that may be present in the determination of the normalized corrected net thrust values as a function of thrust lever angle (FNTR1A$_{NORM\ \%\ TLA}$). For example, in Step Five a reverse normalized corrected maximum rated fan speed value as a function of thrust level angle (N1R1A$_{NORM\ \%\ TLA\ rev}$) may be determined using a reverse table lookup process (or reverse algorithm) similar to that described under Step Three. In Step Six, the reverse normalized corrected maximum rated fan speed value as a function of thrust level angle (N1R1A$_{NORM\ \%\ TLA\ rev}$) determined in Step Five may be added to the compensation factor determined in Step Three; e.g., as shown in Equation 5 below.

$$N1R1A_{NORM\ \%\ TLA} = N1R1A_{NORM\ \%\ TLA\ rev} + \Delta N1R1A_{interp} \quad \text{Eqn. 5}$$

In Step Seven, the normalized corrected fan speed values (N1R1A$_{NORM}$) may be adjusted to substantially agree with the thrust lever angle compensated value (N1R1A$_{NORM\ \%\ TLA}$) determined in Step Six to permit a more accurate correlation between thrust lever angle and engine power produced. In this manner, the present disclosure system and method (which uses actual engine data) obviates the need to utilize predetermined generic assumptions (e.g., assuming a worst case) and the error that may be associated therewith.

Figure 6:
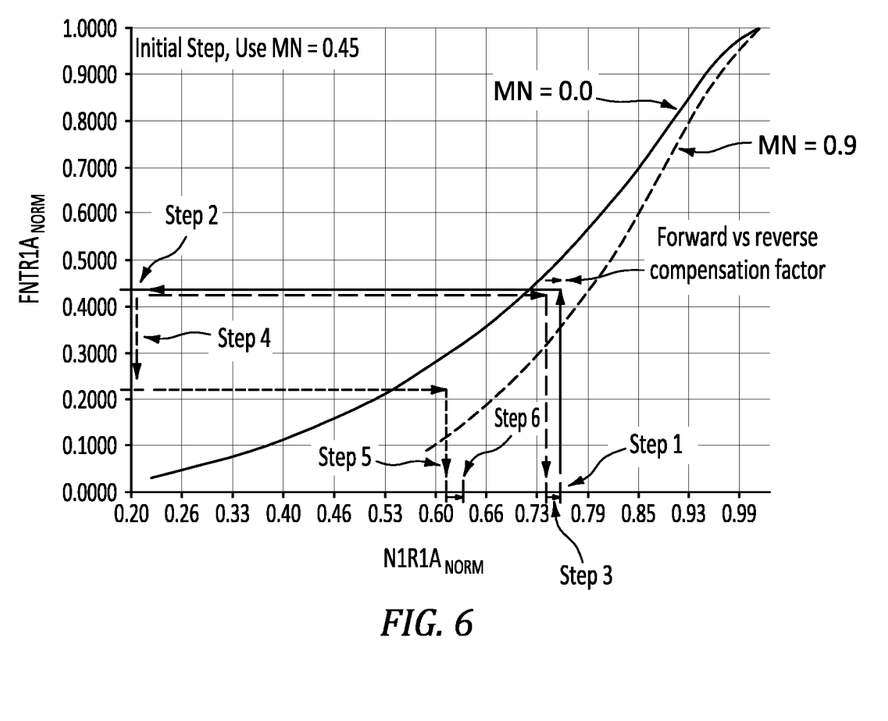
FIG. 6 is a graph diagrammatically illustrating an example of the operation of the present disclosure.

The graph shown in FIG. 6 provides as an example of the operation of the present disclosure to illustrate aspects of the methodology described above. The graph includes a vertical axis of normalized corrected net thrust values (FNTR1A$_{NORM}$) and a horizontal axis of normalized corrected fan speed values (N1R1A$_{NORM}$). At the Initial Step, a Mach number is selected (MN=0.45) that is disposed between the two operational extremes for a given aircraft/engine 24 embodiment. In this example, the two operational extremes are a Mach number of zero (MN=0) and a Mach number of ninety percent of Mach one (MN=0.9). As indicated above, certain other operational parameters (e.g., air temperature, humidity, etc.) may be assumed. In Step One, the PTS management control logic is used to determine a maximum normalized corrected fan speed value (N1R1A$_{NORM}$ MAX RATED). In the graph shown in FIG. 6, the corrected fan speed value is approximately 0.761 (N1R1A$_{NORM\ MAX\ RATED}$~0.761). In Step Two, the maximum normalized corrected fan speed value (N1R1A$_{NORM\ MAX\ RATED}$~0.761) and the Mach number value (MN=0.45) are used with the stored data structure (or algorithm) to determine a maximum normalized corrected net thrust value (FNTR1A$_{NORM\ MAX\ RATED}$), which in this example is about 0.42. In Step Three, a reverse look up process is applied using the maximum normalized corrected net thrust value (FNTR1A$_{NORM\ MAX\ RATED}$) of about 0.42 and the Mach number (0.45) to determine a reverse maximum normalized corrected maximum rated fan speed value (N1R1A$_{NORM\ MAX\ RATED\ REV}$), which can be seen in FIG. 6 is about 0.741. Step Three further includes determining a compensation factor ($\Delta$N1R1A$_{interp}$), using the difference between the maximum normalized corrected fan speed value (N1R1A$_{NORM\ MAX\ RATED}$) and the reverse maximum normalized corrected fan speed value (N1R1A$_{NORM\ MAX\ RATED\ REV}$); e.g., see Equation 3 above—(0.761−0.741=0.02). In Step Four, the maximum corrected net thrust value (FNTR1A$_{NORM\ MAX\ RATED}$) is multiplied by the thrust lever angle percentage (% TLA) to determine a normalized corrected net thrust value as a function of thrust lever angle (FNTR1A$_{NORM\ \%\ TLA}$), which as shown in FIG. 6 is about 0.21. In Step Five, a reverse look up process is applied using the normalized corrected net thrust value as a function of thrust lever angle (FNTR1A$_{NORM\ \%\ TLA}$~0.21) and the Mach number (0.45) to determine a reverse normalized corrected maximum rated fan speed value as a function of thrust level angle (N1R1A$_{NORM\ \%\ TLA\ rev}$), which is about 0.610. In Step Six, the reverse normalized corrected fan speed value as a function of thrust level angle (N1R1A$_{NORM\ \%\ TLA\ rev}$) determined in Step Five may be added to the compensation factor determined in Step Three; e.g., as shown in Equation 5 above (0.610+0.02=0.630) to obtain the normalized corrected fan speed as a function of thrust lever angle (N1R1A$_{NORM\ \%\ TLA}$). In Step Seven, the normalized corrected fan speed as a function of thrust lever angle (N1R1A$_{NORM\ \%\ TLA}$) may be further adjusted to permit a more accurate correlation between thrust lever angle and engine thrust produced. In this manner, the present disclosure system and method (which uses actual engine data) obviates the need to utilize predetermined generic assumptions (e.g., a worst case assumption) and the error that may be associated therewith.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method for operating a gas turbine engine powered aircraft by correlating engine thrust and engine thrust lever angle (TLA) during operation of the gas turbine engine powered aircraft, said method comprising:
   (a) determining initial flight conditions during operation of the aircraft, said initial flight conditions including an initial Mach number of the aircraft, an initial altitude of the aircraft, and an initial TLA, and reporting said initial flight conditions to an onboard controller within the aircraft;
   (b) determining a corrected maximum fan speed value based on an initial sensed fan speed and the initial flight conditions determined in step (a);
   (c) providing a stored data structure containing a range of corrected fan speed values and corrected net thrust values as functions of Mach number values, and determining a first corrected net thrust value based on said stored data structure;
   (d) performing a reverse lookup of the stored data structure to determine a reverse corrected maximum fan speed value, and determining a compensation factor based on the corrected maximum fan speed value determined in step (b) and the reverse corrected maximum fan speed value;
   (e) determining a second corrected net thrust value as a function of the initial TLA and the first corrected net thrust value determined in step (c); and
   (f) correlating an engine fan speed to the initial TLA using the second corrected net thrust value as a function of the initial TLA and the compensation factor determined in step (d), and determining a corrected maximum rated fan speed value as a function of the initial TLA; and
   (g) operating the gas turbine engine at the corrected maximum rated fan speed value as a function of the initial TLA determined in step (f).

2. The method of claim 1, wherein the stored data structure is accessible by the onboard controller.

3. The method of claim 2, wherein the stored data structure is a data table.

4. The method of claim 3, wherein data stored in the data table is produced using a thermodynamic steady-state engine model.

5. The method of claim 4, wherein the thermodynamic steady-state engine model is run with one or more fixed flight condition variables.

6. The method of claim 5, wherein the one or more fixed flight condition variables include ambient air temperature and ambient air humidity.

7. The method of claim 1, wherein the first corrected net thrust value is a normalized value.

8. The method of claim 1, wherein determining the corrected maximum rated fan speed value as a function of the initial TLA includes performing a second reverse lookup of the stored data structure to determine a second reverse corrected maximum rated fan speed value as a function of the initial TLA based on the second corrected net thrust value determined in step (e) and the initial Mach number.

9. The method of claim 8, wherein the stored data structure is accessible by the onboard controller.

10. The method of claim 9, wherein the stored data structure is a data table.

11. The method of claim 10, wherein data stored in the data table is produced using a thermodynamic steady-state engine model.

12. A system for correlating engine thrust and engine thrust lever angle (TLA) during operation of an aircraft, the aircraft having a gas turbine engine and a thrust lever in communication with the gas turbine engine, the system comprising:
   a first sensor operable to determine an initial Mach number of the aircraft;
   a second sensor operable to determine an initial thrust lever angle (TLA) of the thrust lever and to provide a signal representative of the initial thrust lever angle;
   a third sensor operable to sense an initial fan speed value and provide a signal representative of the initial fan speed; and
   an onboard controller in communication with the first, second, and third sensors, and a memory device storing instructions, which instructions when executed cause the onboard controller to:
      determine a corrected maximum fan speed value based on the fan speed sensed using signals from the third sensor and one or more initial flight conditions;
      determine a first corrected net thrust value based on the corrected maximum fan speed value and the initial Mach number;
      determine a compensation factor based on the corrected maximum fan speed value and a reverse corrected maximum fan speed value, the reverse corrected maximum fan speed value determined based on a stored data structure containing a range of corrected fan speed values and corrected net thrust values as functions of Mach number values;
      determine a second corrected net thrust value as a function of the initial TLA and the first corrected net thrust value;
      correlate an engine fan speed to the initial TLA using the second corrected net thrust value as a function of the initial TLA and the compensation factor, and determine a corrected maximum rated fan speed value as a function of the initial TLA; and
      operate the gas turbine engine at said corrected maximum rated fan speed value as a function of the initial TLA.

13. The system of claim 12, wherein the stored data structure is accessible by the onboard controller.

14. The system of claim 13, wherein the stored data structure is a data table, and data stored in the data table is produced using a thermodynamic steady-state engine model.

15. The system of claim 14, wherein the thermodynamic steady-state engine model is run with one or more fixed flight condition variables.

16. The system of claim 15, wherein the one or more fixed flight condition variables include ambient air temperature and ambient air humidity.

17. The system of claim 12, wherein the first corrected net thrust value is a normalized value.

18. The system of claim 17, wherein determining the corrected maximum rated fan speed value as a function of the initial TLA includes performing a second reverse lookup of the stored data structure to determine a second reverse corrected maximum rated fan speed value as a function of the initial TLA based on the second corrected net thrust value and the initial Mach number.

* * * * *